United States Patent
Yee et al.

Patent Number: 5,345,262
Date of Patent: Sep. 6, 1994

[54] AUTOMATIC CONVERGENCE SYSTEM FOR COLOR VIDEO PROJECTOR

[75] Inventors: Eugene M. Yee, Carlsbad; Beverly E. Sutherland, San Diego; John J. Lyon, San Marcos; Tiemen T. Spits, Oceanside, all of Calif.; Richard M. Filia, Portland, Oreg.

[73] Assignee: Hughes-JVC Technology Corporation, Carlsbad, Calif.

[21] Appl. No.: 923,195

[22] Filed: Jul. 31, 1992

[51] Int. Cl.$^5$ .............. H04N 17/04; H04N 17/02; H04N 9/31
[52] U.S. Cl. .................... 348/177; 348/745
[58] Field of Search .................. 358/10, 60, 231, 139, 358/125, 51; 348/177, 745, 189, 190; H04N 9/31, 17/02, 17/04

[56] References Cited

U.S. PATENT DOCUMENTS

| | | | |
|---|---|---|---|
| 4,683,467 | 7/1987 | Macaulay | 358/10 |
| 4,816,908 | 3/1989 | Colineau | 358/10 |
| 4,868,668 | 9/1989 | Tavernetti | 358/10 |
| 4,988,857 | 1/1991 | Karasawa et al. | 250/205 |
| 4,999,703 | 3/1991 | Henderson | 358/10 |
| 5,049,791 | 9/1991 | Kawakami | 358/139 |
| 5,159,436 | 10/1992 | Soneira | 358/10 |
| 5,181,098 | 1/1993 | Guerin | 358/10 |

*Primary Examiner*—James J. Groody
*Assistant Examiner*—Chris Grant
*Attorney, Agent, or Firm*—Harness, Dickey & Pierce

[57] ABSTRACT

A color video projection system (10) in which images of three separate colors (22,24,26) are separately projected to converge on a common region of the screen (20) is provided with automatic convergence control to ensure that three images are precisely superimposed upon each other. A test pattern of a number of pattern units (36,38) of an intensity (42,44,48) that varies over each unit in a similar manner is imaged on a two dimensional matrix array of charged coupled devices (CCD) (32). The test pattern is projected in sequence by each of the three CRT projectors (50,54,58,14,16,18) of the system, and during the projection of the test pattern, the position of the centroid (40) of each unit of the test pattern is determined from the light intensity pattern received by the CCD matrix array, and stored (112). The centroid positions of each unit of a test pattern of two of the projectors are compared with positions of the centroids of each unit of the test pattern projected by a third one of projectors. The comparison develops an error signal for each unit of each test pattern, enabling convergence correction signals to be fed to convergence control deflections coils (120,122,124) of each of the cathode ray tubes (50,54,58) so as to effectively shift each of two of the images to superposition with the third.

21 Claims, 4 Drawing Sheets

AUTOMATIC CONVERGENCE SYSTEM FOR COLOR VIDEO PROJECTOR

BACKGROUND OF THE INVENTION

1. Field of the Invention

The present invention relates to multi-color projection systems, and more particularly concerns methods and apparatus for automatic correction of misconvergence of plural images of a multi-image projection system.

2. Description of Related Art

A common type of color projection system employs three separate but closely positioned cathode ray tube projection devices, each provided with a separate projection lens system that directs the image of each cathode ray tube to a common region of a projection screen so that three separate monochromatic color images are superposed on one another to provide a single multi-color image. Precision of superposition of the three different color images is essential in such a system to avoid degraded resolution and rough, blurred composite images. To enhance precision of convergence of all three separately colored monochromatic images, various types of convergence systems have been developed. Manual systems are labor intensive, tedious and extremely time consuming, requiring time measured in the order of hours, for example. In addition, the manipulator must have technical knowledge or training sufficient to execute the correction. Such ability is seldom available to the average video projector purchaser. Automatic convergence systems avoid disadvantages of manual systems but are subject to limitations with respect to accuracy, speed and reliability. For example, U.S. Pat. No. 4,999,703 for Automatic Image Correction Method and Apparatus For Projectors Utilizing Cathode Ray Tubes provides for automatic convergence by use of a mechanically scanning optical head that samples certain predetermined areas of a projected test pattern. The head is mechanically moved to scan areas of the projection screen in sequence, and of course requires various mechanical scanning elements and motors. Mechanical elements detract from system reliability. The requirement for servo motors greatly adds to cost and complexity of the system. Moreover, because of the sequential physical scanning of such systems, achieving convergence still requires several minutes of time. The system of U.S. Pat. No. 4,999,703 thus involves decreased reliability and increased cost while accuracy of convergence is dependent upon accuracy limits of the motion of the motors.

Another similar type of convergence system employing a lens and sensor that are moved as a unit to point to different areas of the screen by a pair of stepper motors is described in an article entitled "A Versatile Automatic Convergence System for a Three-Lens CRT Projector", by AK Oebel and T. Schmidt, SID 91 Digest pages 159–169.

Accordingly, it is an object of the present invention to provide for automatic convergence by use of methods and apparatus that avoid or minimize the above mentioned problems.

SUMMARY OF THE INVENTION

In carrying out principles of the present invention in accordance with a preferred embodiment thereof there is generated a convergence test pattern comprising an array of discrete pattern units each having perimetral and central areas and each characterized by a variation of illumination intensity between the central and perimetral areas of the unit. Preferably the variation is smooth, substantially linear and continuous. The test pattern is fed to each of a number of separate image forming means of the system, to be projected sequentially from the several image forming means as first and second mutually identical test patterns. An array of light sensitive elements is positioned to receive light reflected from the test patterns projected on the screen. In response to the sensor array, the position of each of the units of a first one of the test patterns is compared with the positions of corresponding ones of each of the units of the second test pattern to develop a number of error signals. The error signals are employed to control the image forming means so as to shift positions of one of the test patterns relative to the other in a sense to decrease the magnitude of the error signals.

In accordance with a feature of the present invention, positions of the several units of each of the patterns are compared by determining the centroid of the smoothly varying illumination intensity of each such test pattern and comparing positions of such centroids.

DESCRIPTION OF PREFERRED EMBODIMENTS

Figure 1:
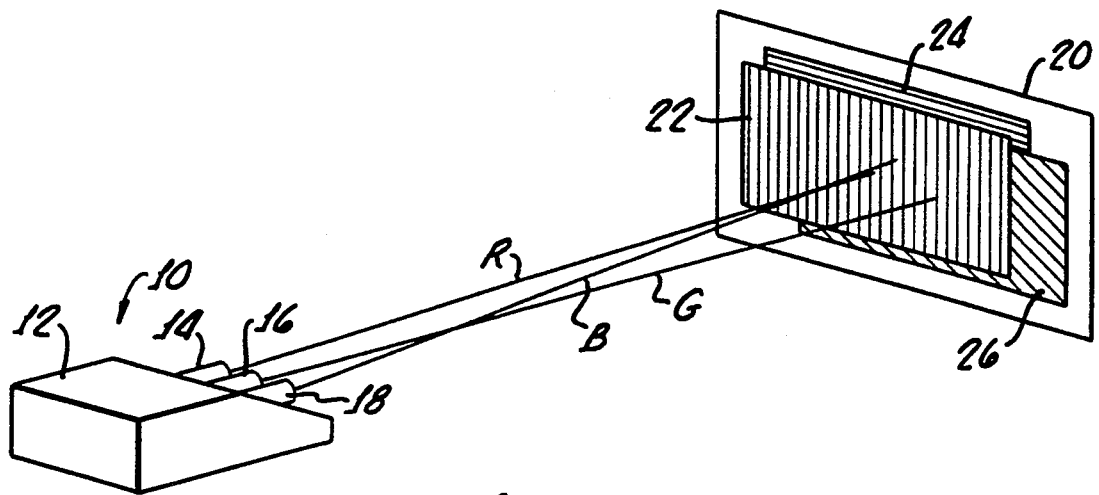
FIG. 1 illustrates the problem of misconvergence in a three projector system.

As illustrated in FIG. 1, a conventional color projector 10 includes a housing 12 in which are mounted three cathode ray tube (CRT) based projectors, each of which is fed with an image representing a single color component of a multi-colored image. Each of the projectors includes a projection lens system, such as lens systems 14, 16 and 18, which project the individual image components along converging optical paths from the respective projectors to a screen 20 to provide a red image 22, a blue image 24 and a green image 26. If ideally converged, the three images, each of a different color, are accurately and precisely superposed on one another so that the resulting composite image appears to be a single multi-colored image. FIG. 1 shows the three images in a highly exaggerated condition of misconvergence, which is a situation that greatly degrades the resulting composite multi-color image. It is the purpose of a convergence system, whether manual or automatic, to cause the three images to be precisely superposed upon one another so that no visibly discernable misregistration of the three monochromatic images exists.

Figure 2:
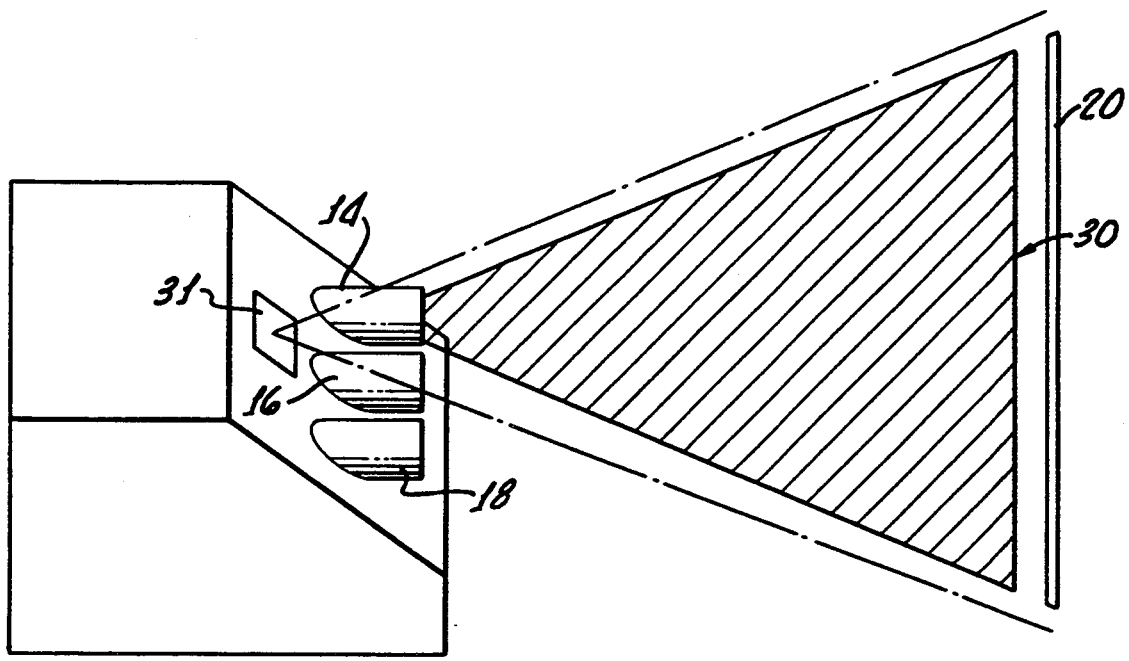
FIG. 2 illustrates projection of a test pattern from one of the system projectors and reflection of test pattern light to a sensor array.

FIG. 2 broadly illustrates an aspect of the automatic convergence system of the present invention. The three projection systems, including projections lenses 14, 16 and 18, are operated in sequence to project identical test patterns on screen 20, one after the other. Thus, FIG. 2 illustrates the projector employing projection lens 14 projecting a test pattern, generally indicated at 30, upon the screen to cover substantially the entire area of the screen that will be covered by projected images. In other words, the test pattern on the screen, is co-extensive with the projected video images. Light of the test pattern is reflected from the screen to be collected by a sensor lens system 31 and directed to impinge upon a two dimensional matrix array (not shown in FIG. 2) of charged coupled devices (CCD). Preferably the CCD matrix array lens system 31 and the CCD matrix itself are fixedly mounted to the projector adjacent to and slightly above the center projection lens 16. A charge injection device or other types of light sensitive elements may be used instead of the charge coupled device.

Figure 3:
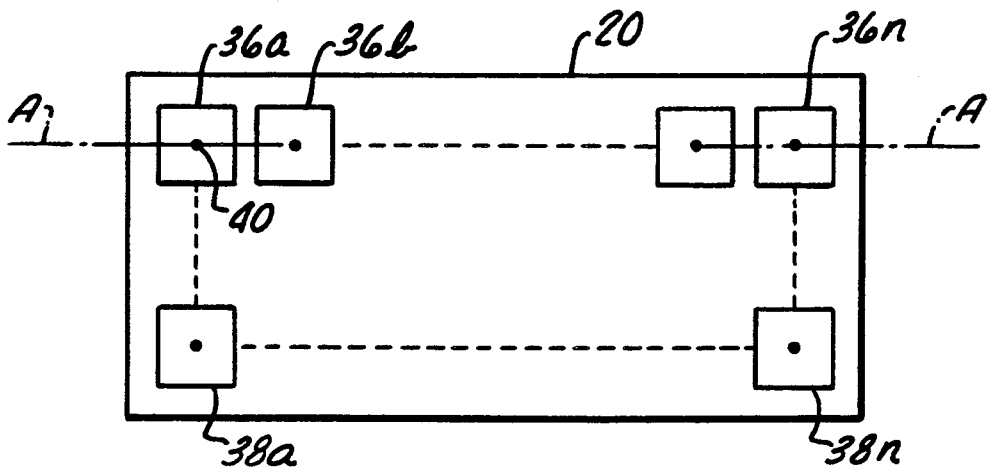
FIG. 3 shows an exemplary test pattern.
Figure 4:
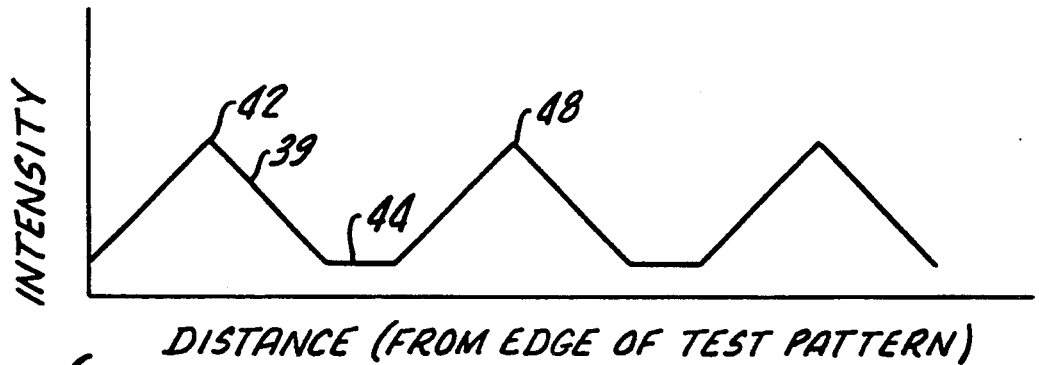
FIG. 4 shows an exemplary light intensity variation of units of a test pattern.

FIGS. 3 and 4 illustrate the test patterns, identical for each of the projectors of the three projector system, that are projected, one at a time, on the screen. The test pattern comprises an N×M array of test pattern illumination units, such as units 36a through 36n and 38a through 38n. The test pattern units form an array of multiple rows, indicated by units 36a through 36n for an uppermost row, and units 38a through 38n for a lowermost row. The pattern, of course, also has columns of units, indicated for a first column by units 36a through 38a, and for a last column indicated by units 36n through 38n. The test pattern units are rectangular, preferably square, and are mutually spaced from one another by small distances in a regular rectangular array. The entire test pattern has a size that substantially covers the entire area of the screen, or at least covers all of the area of the screen upon which the multi-color image is to be projected.

Each test pattern unit has a uniquely varying illumination intensity pattern within its perimeter. Thus a center point 40 of pattern unit 36a may be a spot within the test pattern unit of maximum illumination intensity (brightest light), which intensity falls off in a uniform manner in all directions toward all parts on the perimeter of the unit 36a. For example, a curve 39 (FIG. 4) of illumination intensity along a line A—A (FIG. 3) extending through the centers of the units of the first row, has a variation such as is illustrated in FIG. 4. This figure is a plot of illumination intensity (ordinate) against distance (abscissa) along the centers of the first row of test pattern units. Intensity at point 40 has a peak or a maximum value at point 42 on the wave-form 39 which corresponds to geometrical center of the unit 36a. This peak intensity falls off substantially linearly and smoothly in all directions and toward both sides of the unit 36a to a low level or near "black" intensity level indicated at 44. This is the intensity level between adjacent units. An adjacent test pattern unit 36b has a peak intensity at its geometrical center, indicated at 48 in FIG. 4, which peak intensity also falls off in all directions to provide an intensity variation which is precisely identical to the intensity variation of unit 36a. Similarly, the intensity of illumination for each test pattern unit varies substantially linearly and smoothly in a vertical direction, that is, along the direction of the rows of test pattern units. Variations from the center of maximum intensity for all test pattern units are identical to each other.

In a present embodiment a smooth, nearly linearly varying analog test pattern signal is employed. Such a signal can be created by an analog circuit, such as an analog integrator, and is free of discontinuities. It produces an intensity that is smoothly varying in a linear or near linear fashion from a peak of maximum intensity at the center in all directions toward the perimeter. Of course the variation could be the reverse, with a peak intensity at all points along the perimeter of a unit, varying to a minimum level of intensity at the center.

It will be readily understood that, alternatively the intensity variation may be generated digitally. If digital generation is employed, it is preferable to smooth the intensity variation pattern by optical de-focusing or to provide a digital signal test pattern generator that is electronically filtered prior to input. The smoothing or filtering of such a signal is to minimize adverse effects on accuracy that tend to result from discrete variations of digital signals. Information incident on the "dead" region between pixels of the CCD array can cause discontinuities in the CCD output signal. These discontinuities in turn may cause position errors in the misconvergence correction calculations. Accordingly, if digital signals are employed for the test pattern, smoothing or some other technique is used to minimize the discontinuities to avoid inaccuracies in determination of centroid locations.

Figure 5:
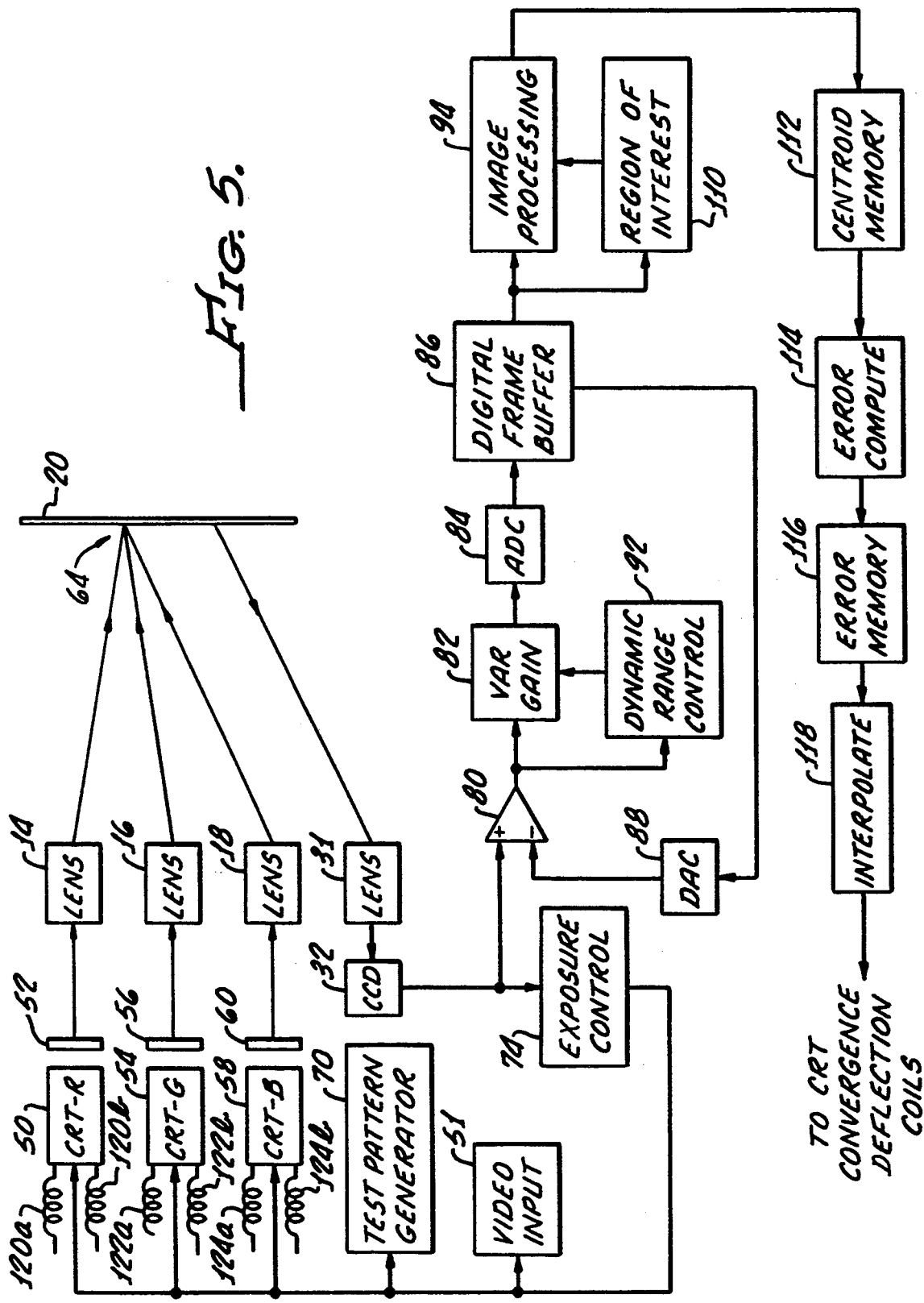
FIG. 5 is a functional block diagram of a system incorporating features of the present invention.

FIG. 5 shows both a block diagram of the convergence control described herein and schematically illustrates the three cathode ray tube projectors. There is provided a first projector including a monochromatic ("black and white") cathode ray tube 50, the image on the face of which is transmitted via a liquid crystal device 52 to the first projection lens 14. A second monochromatic cathode ray tube 54 transmits the image on its face via a second liquid crystal device 56 to the second lens system 16, and the third monochromatic cathode ray tube 58 transmits the image on its face via a third liquid crystal device 60 to the third lens system 18. It will be readily understood that conventional projectors are employed and some, but not all of the components of the projectors are illustrated to maintain clarity of the illustration. As previously mentioned, the lens systems are arranged to project the image generated by their respective cathode ray tubes to a common area 64 on screen 20, where the three images are ideally precisely superposed. Each CRT is provided with video input from a source 51 that represents a single color component of the composite image. Thus, for example, CRT 50 may be provided with a red component of the image, CRT 54 with a green component of the image, and CRT 58 with the blue component of the image. All CRT's are black and white devices. Individually different spectral content is provided by various well known arrangements, such as, for example, appropriate color filters positioned in projection lenses 14, 16 and 18. Alternatively, color selective dichroic mirrors may be used in the projector illumination paths, prior to the CRT's. Thus projection lens 14 projects a red image, for example, projection lens 16 projects a green image, and projection lens 18 a blue image, with all three being superposed to provide a single multi-color image.

For automatic convergence a CCD device 32 is provided with its own sensor lens system 31, which transmits light from the image projected on screen 20 to the several elements of the CCD. In an exemplary embodiment of the present invention the CCD matrix array is two dimensional, having for example an array of 192 pixels×165 pixels and has a high dynamic range, in the order of 60 decibels. The lens system is fixedly mounted in front of the CCD matrix array and views the projector screen 20. In a presently preferred embodiment the lens system may include lenses having variable focus, variable zoom and fixed aperture. The lens system may also include an infrared filter, color filters and polarizers, either circular or linear, for each lens. If the system uses polarized light, such as employed in many liquid crystal projection systems, polarizing filters may also be included for contrast enhancing purposes. The lens color filters (red, green and blue, respectively) provide different colors from the three converging lenses. Light rays are schematically indicated in FIG. 5 as extending between the several projection lenses 14, 16 and 18 and the screen and are shown to converge at a point 64 on the screen. Nevertheless, it will be understood that the light projected from each of these lens systems covers substantially all the screen area and that all of this same area is the area viewed by the CCD lens 31.

A test pattern generator 70 is provided to generate the test pattern illustrated in FIGS. 3 and 4, and, under timing control of system timing and control circuits (not shown), feeds the identical test pattern to the video input of each of the cathode ray tubes 50, 54, 58 in sequence. The test pattern is strobed in synchronism with the vertical sync signal of the cathode ray tube for a number of frames. In other words, the CRT video is turned on for such number of frames to control test pattern exposure time and, therefore, to control test pattern brightness. The amount of light incident on the CCD matrix array is difficult to control by aperture variations, and, therefore, is controlled by causing the test pattern to be projected for a certain number of frames. The number of frames is determined by the total amount of light received by the CCD at a point of maximum intensity of light of a unit of the test pattern (e.g. a central point of the unit). Based upon analysis of this peak intensity, the number of exposure frames is chosen to ensure that the output level of the CCD at such intensity point has a magnitude that is near, but less than, the maximum (saturation level) output level of the CCD. For example, with eight bits of intensity level signals providing 256 intensity levels (where 0 is black and 256 is maximum brightness that would saturate the CCD matrix array), the strobe time or number of frames for projection of each test pattern is adjusted to provide an intensity level roughly between about 200 and 240. This avoids putting the CCD matrix array into saturation, but is a long enough time and provides a sufficiently high maximum intensity to achieve optimum signal to noise ratio for the system. To this end the output of the CCD 32 is fed to an exposure control circuit 74, which in turn feeds a signal to the test pattern generator to control the number of frames for projection of the test pattern.

As previously described in connection with FIGS. 3 and 4, the test pattern that is projected is comprised of discrete rectangular pattern units of light intensity variations that are identically repeated multiple times in horizontal and vertical rows. The darkness and brightness of the discrete pattern unit varies by a predetermined relationship from the perimeter of each unit to its center. The intensity pattern can be configured, as previously mentioned, to be darkest at the perimeter and brightest toward the center. Alternatively, the pattern may be darkest at the center and brightest at its perimeter. This maximized variation is uniform across each unit of the test pattern and enables accuracy of convergence to be greatly increased.

To locate the position of each pattern unit, the location of the centroid of the intensity variation of each pattern unit is computed. Location of such centroid locates position of the center of the pattern to a high degree of resolution. Interpolation affords a resolution that is finer than the pixel to pixel spacing of the CCD array. The described pattern units are of a generally square shape, primarily because squares and rectangles are easier shapes to implement, although it will be readily appreciated that other shapes of pattern units may be employed.

The intensity variation of each unit is generated from an analog signal according to a presently preferred embodiment. Such signals are readily created by conventional analog circuits, such as analog integraters, and thus the intensity variation is a smooth signal, free of discontinuities. Alternatively, the test pattern may be generated digitally, but if so must be smoothed by optical de-focusing or some other technique, such as electronically filtered, so as to minimize adverse effects on accuracy that tend to result from the discrete steps of digital signals.

In operation of the automatic convergence of the disclosed embodiment, the following steps are executed sequentially for each one of the three cathode ray tubes, one CRT at a time. These steps are described herein in connection with the block diagram illustrated in FIG. 5.

Step 1—A test pattern is projected from one projector and the number of frames (e.g. exposure time) for the test pattern is determined, as described above, to obtain a high intensity level of each pattern unit intensity peak without CCD saturation. Normally this first step is carried out for all three projectors to maximize signal to noise ratio. Exposure time is different for each projector because the output of the three CRT's are not equal to each other and the response of the CCD matrix array is different for different colors.

Step 2—The cathode ray tube is controlled to project a "black level" onto the projector screen for the exposure time determined in Step 1. The black level is a condition of very low or zero intensity output of the cathode ray tube. Light received by the CCD includes light reflected from the screen, and also ambient light. If the projector system employs a liquid crystal device, and therefore projects light of a single polarization state, the CCD lens system 31 includes a polarizing filter positioned at the front of the lens. Such a polarizing filter passes through to the CCD matrix array all of the projector output (which is of a single polarization state for a liquid crystal device), and only one-half of the ambient light. Therefore an improved contrast ratio is achieved. In addition, an infrared filter may be positioned in front of the lens of the CCD matrix array to suppress wavelengths of light above about 700 nanometers, to thereby increase the signal to noise ratio of the CCD matrix array.

Step 3—An analog signal corresponding to the image information for the black level and ambient light is provided at the output of the CCD matrix array and fed to one input of a differential amplifier 80. The dark current noise of the CCD matrix array itself also is a component of this CCD output signal. This signal is passed from amplifier 80 through a variable gain device 82 to an analog to digital converter 84 to provide a resultant digital signal that is stored in a digital frame buffer 86. The information stored at this time in the digital frame buffer, including CCD output from the "black" screen, the reflection of ambient light from the screen and the matrix array dark current noise level, may be collectively termed "baseline information".

Step 4—The test pattern is projected on the screen. The test pattern generator 70 is connected to feed the test pattern to the CRT that is being handled at this time so that the test pattern will be projected on the screen by this projector. As previously mentioned, the test patterns that are fed to each of the three CRT's in succession are all identical to one another and are sequentially displayed on the screen. Each test pattern is exposed for a time equal to the number of frames previously determined for exposure, as described above in connection with Step 1. As previously mentioned, the desired number of frames for which the test pattern (and also the black level) is projected is a number of frames less than that required to put the CCD matrix array into saturation but great enough to achieve a nearly maximum signal to noise ratio.

Step 5—Light intensity information received by the CCD, which receives light reflected from the light gathered by its lens system 31 and reflected from the test pattern on screen 20, is read out of the CCD matrix array to provide an analog output signal corresponding to the test pattern image information. This analog signal from the CCD matrix array varies in intensity in accordance with intensity variation of the projected test pattern. At the same time that the analog test pattern information is read out of CCD 32, the baseline information stored in digital frame buffer 86 during Step 2 is converted back to analog information in a digital to analog converter 88 and fed to the second input of differential amplifier 80, where the baseline information is subtracted from the analog output of the CCD matrix array. It may be noted that prior to being fed into the analog to digital converter 84 the CCD analog signal is fed to a dynamic range control circuit 92 which determines whether or not amplification of the signal is necessary to obtain maximum resolution of the analog to digital converter output. If amplification is required the variable gain device 82 is operated to provide the desired amount of gain increase. In this step 4 the output of the analog to digital converter 84, which is the difference of the CCD analog output and the baseline information, is stored in the digital frame buffer 86.

Figure 6:
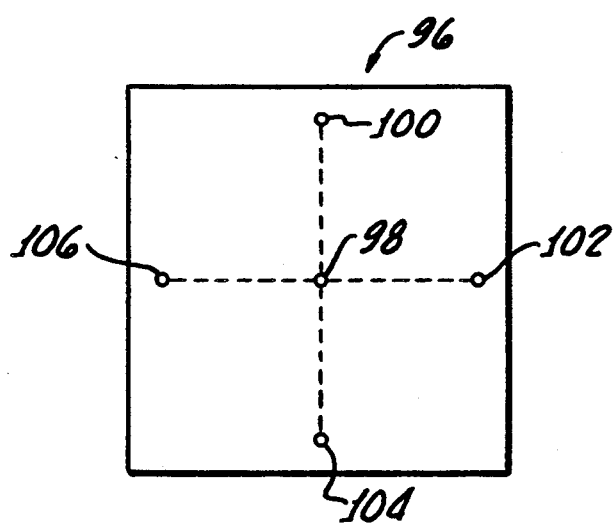
FIG. 6 illustrates a single test pattern unit and aspects of determination of the region of interest for centroid location.

Step 6—Information stored in the frame buffer 86 is then fed to image processing circuitry 94, which operates on the stored information to determine the centroid of each of the test pattern units. The centroid is determined for an area of a "region of interest" which may be less than the entire area of each unit. The region of interest has a minimum intensity around its perimeter of a predetermined level, such as, for example, a level of between 6 and 10 in a 256 level system. Effectively, the region of interest is determined electronically by moving from the geometrical center of a single unit outwardly in each of four or more different directions and noting intensity magnitude as the perimeter of the unit is approached. This enables definition of a region of interest for each unit wherein the intensity level at the perimeter of the region of interest is the predetermined amount. Thus, for example, a single test pattern unit 96 is illustrated in FIG. 6 having a midpoint 98 which has a maximum intensity level, such as, for example, in the order of 200. Intensity levels within the perimeter of unit 96 are then explored in an upward direction until a point 100 is reached, having the predetermined minimum intensity level, such as level 10, for example, of this unit. Intensity levels are also explored to define points 102, 104 and 106 adjacent other perimetral sides of the square test pattern unit 96 and at which the intensity level has the predetermined minimum level of 10. These four points, 100, 102, 104 and 106 or additional comparable perimetral points of light low intensity level then define the perimeter of the region of interest which will be examined by a centroid algorithm to determine the unit centroid.

The region of interest is that region of each unit on which the centroid algorithm will operate and is determined for each discrete test pattern unit of the test pattern. The centroid finding algorithm is defined by the following equations, which define x and y coordinates of the centroid:

$$x \text{ centroid} = \frac{\Sigma\Sigma [x \cdot g(x, y)]}{\Sigma\Sigma g(x, y)}$$

$$y \text{ centroid} = \frac{\Sigma\Sigma [y \cdot g(x, y)]}{\Sigma\Sigma g(x, y)}$$

where g(x,y) is the intensity value or pixel digital value at location (x,y) within the CCD array, x is the horizontal column location of the intensity value sampled, and y is the vertical row location of the intensity value sampled. In effect, in the centroid determination the intensity values at each pixel of the entire array are multiplied by the x location of such pixel, and the sum of such products are divided by the sum of the intensity levels over all locations to obtain the x position of the centroid. Similarly for the y centroid, the sum of the products of the y location of each pixel of the entire array with the intensity of such pixel is divided by the sum of all intensity levels over all pixels.

Because of regularity of the intensity variation over each unit from the unit center point, the centroid is effectively the geometric center of the unit. The use of the described centroid finding algorithm provides for improved accuracy in the presence of variation of intensity variation patterns of each unit. The signal processing for determination of the region of interest is indicated in FIG. 5 by box 110.

The calculated x,y positions of the centroids of each unit of the test pattern that are being observed are stored in a centroid memory 112. Positions of centroids of each of the test patterns projected by each of the three projectors are stored one after the other in the centroid memory 112. When this position information of the centroids has been obtained and stored for test patterns projected through lenses of all three cathode ray tubes, a high speed arithmetic unit, generally indicated at 114, compares the position information of corresponding centroids of each of two patterns, with position information of corresponding centroids of one projected pattern chosen as a reference. Position differences or error signals between the three lenses are then calculated. A first set of individual error signals, each representing the error of a single one of the centroids of the test pattern, are achieved for position errors between a first one of the CRT test patterns, which is employed as a reference for example, and the positions of the centroids of a second one of the test patterns. A second set of error signals is also obtained for position differences between the positions of centroids of the same reference test pattern and the positions of centroids of the third test pattern. For example, to obtain convergence of all three images, it is only necessary to select one of the images as a reference and to move the other two into precise superposition therewith. Thus, if green is selected as the reference, it is necessary to calculate the position errors between each centroid of the red pattern and green pattern so as to be able to move the red image into superposition with the green image. It is also necessary to calculate position errors between blue and green so as to move blue into precise superposition with the green image.

Computed position errors between corresponding centroids of red and green test patterns and between blue and green test patterns are stored in an error memory 116 which feeds the error information to interpolation circuitry 118, if deemed necessary or desirable, to interpolate corrections or errors for substantially every point on the screen.

Each cathode ray tube, in addition to its primary horizontal and vertical deflection coils, is provided with a pair of auxiliary convergence deflection coils 120a,120b, 122a,122b and 124a,124b, respectively. Activation of these convergence deflection coils by the error signals significantly minimizes the differential error to a point where the errors are within an acceptable range of position errors.

It will be understood that the described convergence procedure is carried out by a microprocessor and associated timing and control circuitry so that, for example, determination of exposure time, solution of the centroid finding algorithm (image processing), determination of region of interest, error computation and interpolation may be actually carried out by software that suitably programs microprocessor operation. Functional blocks in the drawing (FIG. 7) represent such software procedures.

Figure 7:
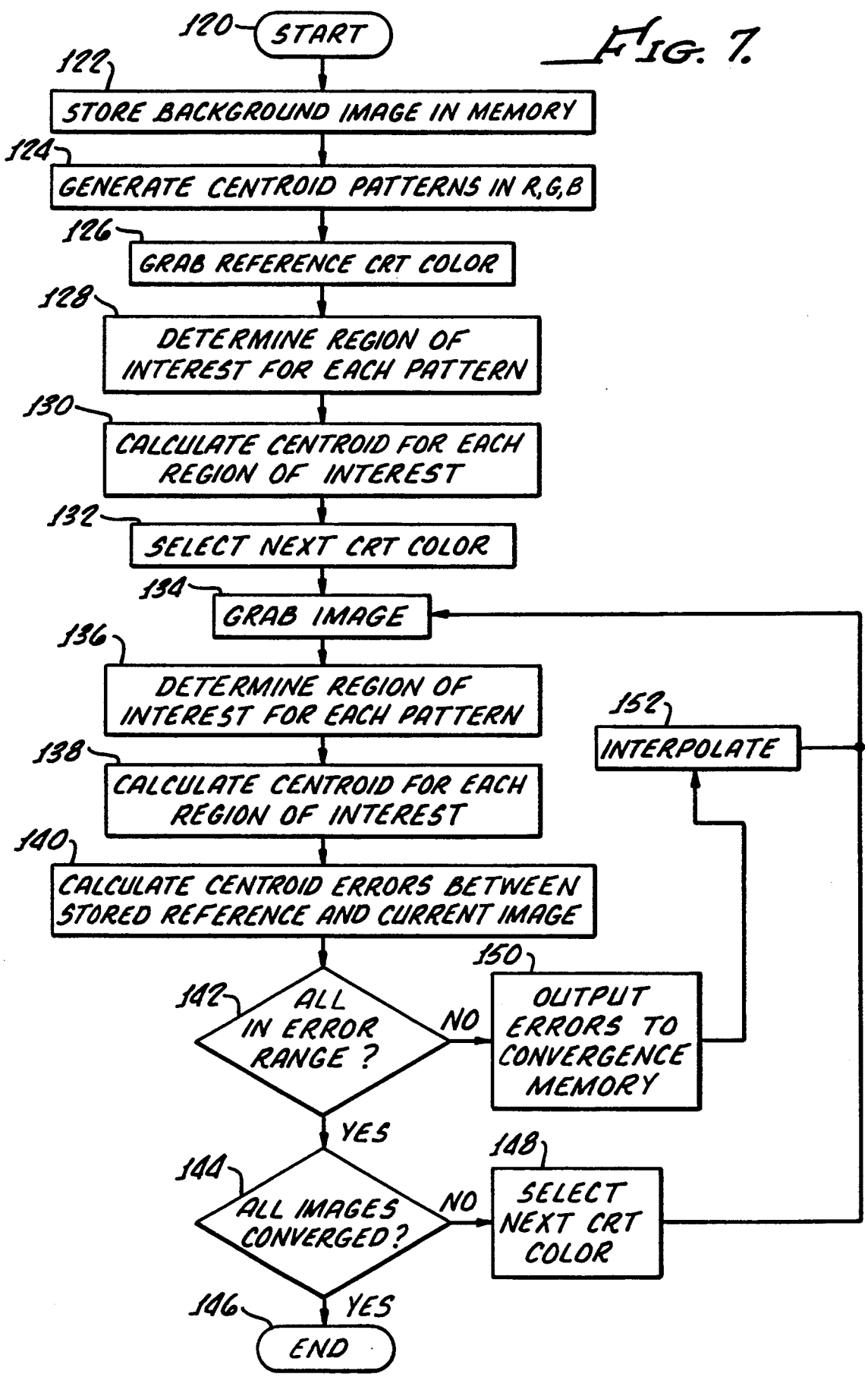
FIG. 7 is a simplified flow chart of a sequence of operations carried out for automatic convergence.

Illustrated in FIG. 7 is a flow chart of certain steps in the overall convergence process carried out by the microprocessor of the described apparatus. Starting in block 120, background or baseline information is stored in block 122, and the centroid pattern of test pattern units are generated for red, green and blue cathode ray tubes 50, 54 and 58, respectively in block 124. One of the cathode ray tube projectors, such as for example the green cathode ray tube 50, is then "grabbed" or selected as indicated in block 126, and the region of interest for each unit of the test pattern is then determined, as in block 128. The x,y coordinates of each centroid of each region of interest are calculated and stored in the centroid memory, as indicated in block 130. Having determined and stored locations of centroids of each unit of the reference (green) test pattern, the next CRT color, such as red CRT 54, is selected, as indicated in block 132, and the red test pattern image is grabbed or projected on the screen, as indicated in block 134. The region of interest for each unit of the red test pattern is then determined, as indicated in block 136, and x,y coordinates of the centroid of the region of interest of each of the units of such test pattern are calculated and stored in the centroid memory, block 138. Now position errors between positions of centroids of corresponding units of the reference and the current image are calculated from the information stored in centroid memory 112, block 140. Block 142 indicates a comparison of the magnitudes of the stored errors with a predetermined maximum allowable error range. If the stored errors are within the allowable error range, no correction is made for this pair of projected test patterns, and the system then determines in block 144, whether or not all images have been converged. In other words, a determination is made as to whether or not both red and blue images have been compared to the reference green image. If they have, the program ends in block 146. If all of the images have not yet been converged, the system them selects the next CRT color, which in this case will be the blue, as indicated in block 148, and the system returns to block 134 to project the blue test pattern and determine its position errors with respect to the reference (green) test pattern.

If the calculated errors are not within the allowable convergence error range in block 142 then it is necessary to shift the image projected by the red (or blue) projector. The errors are fed to the convergence or error memory 116 in block 150 and are employed for interpolation of errors at positions between calculated centroid positions, as in block 152, and the system returns to block 134 to calculate convergence errors for the next color.

Tests of the described system indicate that accuracy of convergence is well within limits required to obtain acceptable clarity and resolution of images. However vertical, accuracy variations may be greater than horizontal accuracy variations. This is believed to be due to multiple ghost images caused by presence of the test pattern images during readout of the CCD matrix array. It has been found that vertical variations in accuracy can be decreased by turning off the test patterns image (blanking the video) during clearing of the CCD matrix array prior to readout, and also during readout.

Convergence control is a major cause of image degradation in multiple projector color systems. Nevertheless, other errors, such as linearity, uniformity and intensity (Z axis) pincushion and trapezoid errors may exist as distortions of images projected by such projection systems. Correction for such distortion errors may also be achieved by using data obtained from the described image processing and the stored centroid position information. Such auxiliary distortion corrections, such as for linearity, uniformity and intensity, and pincushion and trapezoid errors, may normally be carried out prior to correction for misconvergence. However, the misconvergence correction may be readily carried out without employing any other corrections.

There have been described methods and apparatus for detecting and correcting misconvergence of red, green and blue images from a multiple lens, multiple cathode ray tube color projector. A charged coupled matrix array is employed to image a unique video test pattern, and centroid finding image processing and error determination are implemented through a conventional microprocessor, resulting in automatic convergence with higher accuracy, speed and reliability.

What is claimed is:

1. A color projection system comprising:
    a plurality of image forming means for generating a plurality of monochromatic images each respectively representing image components of different spectral content,
    a screen,
    projection means for projecting said images along converging optical paths for mutual superposition on a common region of said screen, and
    convergence means for controlling convergence of said projected images on said common region, said convergence means comprising:
        means for generating a convergence test pattern comprising an array of discrete pattern illumination units each characterized by a substantially uniform variation of light intensity over the unit, means for feeding said test pattern to said image forming means and causing said test pattern to be projected on said screen in sequence from at least first and second ones of said plurality of image forming means, to provide a first projected test pattern from said first image forming means and a subsequently projected second test pattern from said second image forming means, a sensor array of light sensitive elements for reception of light reflected from test patterns projected on said screen, means response to said sensor array for comparing the position of each unit of said first test pattern with the position of a corresponding unit of said second test pattern to develop a plurality of error signals, and means responsive to said error signals for controlling said image forming means to shift the position of said first test pattern on said screen relative to the position of said second test pattern on said screen so as to decrease said error signals.

2. The system of claim 1 wherein light intensity of each unit varies substantially linearly between central and perimetral portions of the unit.

3. The system of claim 1 wherein light intensity of each unit smoothly varies across the unit, and wherein said sensor array is fixedly mounted relative to said projector means.

4. The system of claim 1 wherein light intensity of each unit varies substantially linearly between an inner area of the unit and outer areas of the unit.

5. The system of claim 1 wherein said means for comparing comprises means for determining position of the centroid of each test pattern unit, and means for comparing positions of said centroids to develop said error signals.

6. The system of claim 1 wherein said image forming means comprises first, second and third cathode ray tube devices, wherein said projection means comprises first, second and third projection lenses positioned to project light from respective ones of said cathode ray tube devices, said means for feeding comprising means for causing said first, second and third lenses to project each said test pattern over at least a major portion of said screen, and wherein said sensor array comprises a charge coupled device matrix array having a lens system for imaging said test patterns on said matrix array and fixedly mounted relative to said cathode ray tube devices and lenses.

7. A method for correcting convergence of a plurality of light images projected on a screen in mutual superposition from a plurality of image projectors comprising the steps of:

causing each projector, in sequence, to project an identical test pattern comprising a plurality of discrete pattern units, said tests pattern being substantially coextensive with the light images projected on the screen and comprising an array of discrete pattern illumination units each of which is characterized by a substantially uniform variation of light intensity over the unit, successively define on said array a plurality of sensor patterns respectively representing said projected test patterns, said sensor patterns each comprising a plurality of discrete sensor pattern units, locating and storing positions of predetermined points on each unit of each of said sensor patterns, comparing positions of the predetermined points on each unit of a first one of said sensor patterns with positions of the predetermined points on corresponding units of a second one of said sensor patterns, and determining convergence correction error values based upon said comparing of positions.

8. The method of claim 7 wherein said step of locating positions of predetermined points comprises locating positions of centroids of said sensor pattern units.

9. The method of claim 7 wherein said step of causing each projector to project comprises generating a test pattern comprising an array of discrete pattern illumination units each of which is characterized by a light intensity that varies smoothly across the unit.

10. The method of claim 7 wherein said step of causing each projector to project comprises generating a test pattern comprising an array of discrete pattern illumination units each of which is characterized by a light intensity that varies substantially linearly between an inner area of the unit and outer areas of the unit.

11. The method of claim 7 wherein said step of locating and storing comprises deriving a test pattern output signal from said array of light sensitive devices, sensing a blank output signal of said array of devices representing baseline information received by the array of devices from the screen in the absence of light from said light images projected on the screen, and correcting said test pattern output signal for said baseline information.

12. The method of claim 7 including the steps of controlling exposure of the test pattern of at least one of said projectors by monitoring a magnitude of an output of said light sensitive devices and selecting a duration of exposure less than an exposure time that would saturate said devices.

13. A method for detecting relative positioning error comprising the steps of:

projecting first and second identical patterns on a screen, each said pattern comprising an array of mutually discrete test pattern units wherein each of said test pattern units comprises an area of light that varies smoothly in intensity across said area, locating the centroid of each pattern unit, and comparing locations of each centroid of a unit of said first pattern with the centroid of a corresponding unit of said second pattern to develop signals indicative of relative positions of said patterns.

14. The method of claim 13 wherein said step of projecting comprises employing first and second projectors to project said patterns on nominally identical regions of said screen.

15. The method of claim 13 including the step of imaging each of said test patterns on a fixed array of light sensitive elements to form first and second sensor patterns, each comprising an array of sensor pattern units, said step of locating comprising locating the centroid of each sensor pattern unit, and said step of comparing comprising comparing locations of centroids of units of said sensor patterns.

16. The method of claim 13 wherein said step of projecting comprises forming a test pattern wherein each of said test pattern units comprises an area of light having an intensity that varies continuously between an inner point and a perimeter of such area.

17. The method of claim 13 wherein said step of projecting comprises forming a test pattern wherein each of said test pattern units comprises an area of light having an intensity that varies substantially linearly between an inner point and a perimeter of such area.

18. A color projecting system comprising:
first, second and third cathode ray tube projectors,
a screen,
lens means for projecting converging images of mutually different colors from said projectors in mutual superposition on said screen,
means for generating a test pattern comprising an array of mutually discrete test pattern units wherein each said pattern unit comprises an area of light having an intensity that smoothly varies across the area,
means for causing said projectors to sequentially project said test pattern on said screen as first, second and third mutually identical and sequentially projected patterns,
means including sensor means fixedly mounted with respect to said projectors for finding the locations of the centroid of each unit of each said first, second and third projected patterns,
means for comparing locations of the centroids of units of said first projected pattern with locations of corresponding centroids of units of each of said second and third projected patterns to develop error signals, and
means responsive to said error signals for displacing the projected images of two of said projectors in a sense to decrease said error signals.

19. The system of claim 18 wherein each said pattern unit comprises an area of light that varies smoothly between a central portion thereof and each of a plurality of outer perimetral portions thereof.

20. The system of claim 18 wherein said sensor means comprises an array of light sensitive devices.

21. The system of claim 18 wherein said sensor means comprises a charge coupled matrix array and means for imaging said projected test patterns on said matrix array.

* * * * *

UNITED STATES PATENT AND TRADEMARK OFFICE
CERTIFICATE OF CORRECTION

PATENT NO. : 5,345,262
DATED : September 6, 1994
INVENTOR(S) : Yee et al.

It is certified that error appears in the above-indentified patent and that said Letters Patent is hereby corrected as shown below:

Abstract, line 1          After (10) please insert --,--.

Abstract, line 3          After (20) please insert --,--.

Column 10, line 5         Please delete "them" and insert therefor --then--.

Column 11, line 64        after "unit," please begin a new paragraph and insert --imaging said patterns in sequence upon an array of light sensitive devices to--.
Claim 7

Signed and Sealed this

Thirtieth Day of April, 1996

Attest:

BRUCE LEHMAN

*Attesting Officer*     *Commissioner of Patents and Trademarks*